(12) United States Patent
Ito (10) Patent No.: US 11,520,198 B2
(45) Date of Patent: Dec. 6, 2022

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/511,209

(22) Filed: Oct. 26, 2021

(65) Prior Publication Data

US 2022/0128872 A1 Apr. 28, 2022

(30) Foreign Application Priority Data

Oct. 27, 2020 (JP) .............................. JP2020-179521

(51) Int. Cl.
*G02F 1/1362* (2006.01)
*G02F 1/1368* (2006.01)
*G03B 33/12* (2006.01)
*G03B 21/00* (2006.01)

(52) U.S. Cl.
CPC ...... *G02F 1/136209* (2013.01); *G02F 1/1368* (2013.01); *G02F 1/136286* (2013.01); *G03B 21/006* (2013.01); *G03B 33/12* (2013.01)

(58) Field of Classification Search
CPC ..................................................... G02F 1/1362
See application file for complete search history.

(56) References Cited

U.S. PATENT DOCUMENTS

| | | | |
|---|---|---|---|
| 2007/0077672 A1 | 4/2007 | Kang et al. | |
| 2008/0143664 A1* | 6/2008 | Nakagawa | ............ G02F 1/1368 345/92 |
| 2014/0203285 A1* | 7/2014 | Ito | .......................... H01L 27/124 257/72 |
| 2021/0358420 A1* | 11/2021 | Yang | .................... G09G 3/3233 |

FOREIGN PATENT DOCUMENTS

| | | |
|---|---|---|
| JP | 2007-103910 A | 4/2007 |
| JP | 2009-260327 A | 11/2009 |
| JP | 2011-203288 A | 10/2011 |
| JP | 2014-137526 A | 7/2014 |
| WO | 97/35226 A1 | 9/1997 |
| WO | 2018/074060 A1 | 4/2018 |

\* cited by examiner

*Primary Examiner* — Sang V Nguyen
(74) *Attorney, Agent, or Firm* — Oliff PLC (57) ABSTRACT

A light shielding area including a first conductive layer, a second conductive layer, a first conductor part disposed between the first conductive layer and the second conductive layer, and a transistor surrounded by the first conductive layer, the second conductive layer, and the first conductor part, and a light transmission area surrounded by the light shielding area are provided, wherein an edge of the first conductor part forms a part of a boundary between the light shielding area and the light transmission area.

11 Claims, 10 Drawing Sheets

ELECTRO-OPTICAL DEVICE AND ELECTRONIC APPARATUS

The present application is based on, and claims priority from JP Application Serial Number 2020-179521, filed Oct. 27, 2020, the disclosure of which is hereby incorporated by reference herein in its entirety.

BACKGROUND

1. Technical Field

The present disclosure relates to an electro-optical device, and an electronic apparatus including the electro-optical device.

2. Related Art

In the past, a liquid crystal display device of active drive-type including a thin film transistor (TFT) as a switching element in a pixel, as an electro-optical device has been known. Such a liquid crystal display device is used, for example, as an optical modulation device of a projector. The liquid crystal display device used as the optical modulation device was provided with light shielding structure that prevents light from entering the TFT, because strong light was incident from a light source. The light shielding structure prevented occurrence of optical leakage current in the TFT, and display failures such as flickering.

For example, JP 2011-203288 A discloses an electro-optical device including light shielding structure in a semiconductor layer including a TFT. According to JP 2011-203288 A, a colored insulating film that functions as a light shielding film is also provided at an inner wall portion of a contact hole in a gate electrode of the TFT. In addition, by forming the light shielding structure in only a non-opening area, an opening ratio can be increased while a light shielding property is increased.

However, in the electro-optical device of JP 2011-203288 A, there was a problem in that it was difficult to further increase the opening ratio. Specifically, in order to increase the opening ratio, the non-opening area needs to be decreased, but a description regarding this point is not found in JP 2011-203288 A.

Since an opening ratio is one of important performance indicators of an optical modulation device, there has been a demand for a technology that ensures a light shielding property, and further, improves an opening ratio of a liquid crystal display device.

SUMMARY

An electro-optical device according to the present application includes a light shielding area including a first conductive layer, a second conductive layer, a first conductor part disposed between the first conductive layer and the second conductive layer, and a transistor surrounded from three directions by the first conductive layer, the second conductive layer, and the first conductor part, and a light transmission area surrounded by the light shielding area, wherein an edge of the first conductor part forms a part of a boundary between the light shielding area and the light transmission area.

An electronic apparatus according to the present application includes a light source configured to emit light and the electro-optical device described above as an optical modulation device.

DESCRIPTION OF EXEMPLARY EMBODIMENTS

Exemplary Embodiment 1

Overview of Liquid Crystal Display Device

Figure 1:
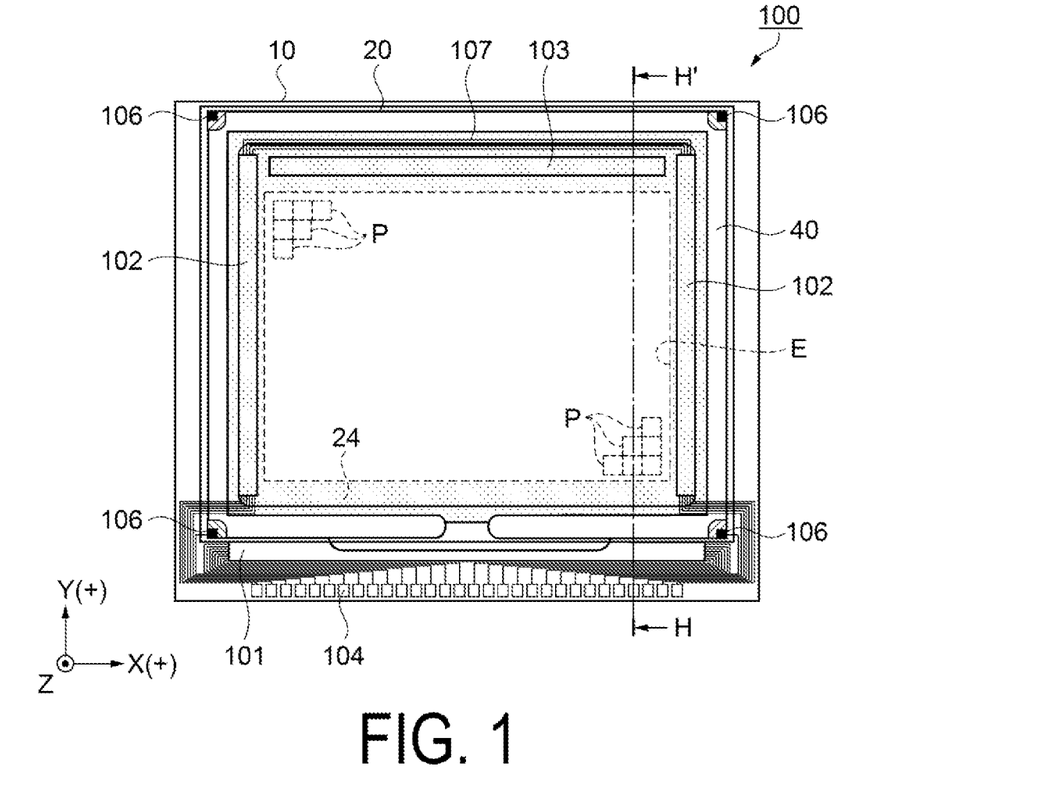
FIG. 1 is a plan view of a liquid crystal display device according to Exemplary Embodiment 1.
Figure 2:
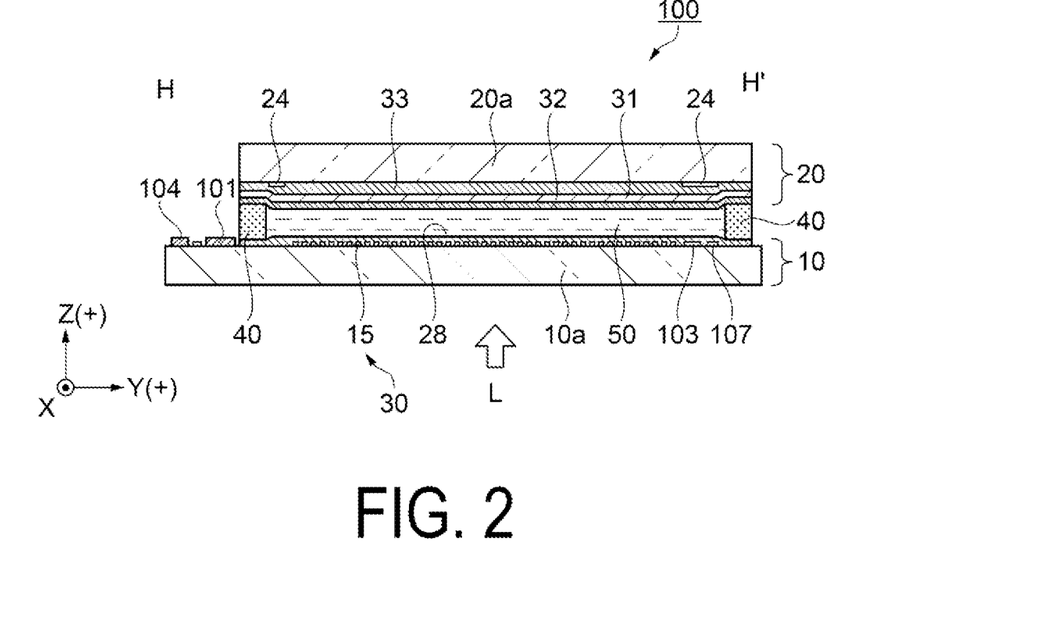
FIG. 2 is a side cross-sectional view taken along an H-H' cross-section of the liquid crystal display device.

FIG. 1 is a plan view of a liquid crystal display device. FIG. 2 is a side cross-sectional view taken along the H-H' cross section in FIG. 1 of the liquid crystal display device.

In each of the figures including FIGS. 1 and 2, XYZ-axes are added as mutually orthogonal coordinate axes, a direction indicated by each arrow is a plus direction, and a direction opposite the plus direction is a minus direction. Note that, a Z plus direction is also referred to as upward and a Z minus direction is also referred to as downward. Viewing from the Z plus direction is referred to as "in plan view".

First, a schematic configuration of a liquid crystal display device 100 as an electro-optical device according to the present exemplary embodiment will be described.

As illustrated in FIG. 1, the liquid crystal display device 100 according to the present exemplary embodiment includes an element substrate 10 as a first substrate, and a counter substrate 20 as a second substrate. The element substrate 10 and the counter substrate 20 are each substantially rectangular, and are superimposed and joined via a seal material 40 disposed along an outer edge of the counter substrate 20. A display area E including a plurality of pixels P arrayed in a matrix is provided inside the seal material 40.

The element substrate 10 includes a data line driving circuit 101, two scanning line drive circuits 102, an inspection circuit 103, and a plurality of external coupling terminals 104. The element substrate 10 is planarly greater than the counter substrate 20. The plurality of external coupling terminals 104 are provided in a region of the element substrate 10 that does not overlap the counter substrate 20, and the data line driving circuit 101 is provided between the plurality of external coupling terminals 104 and the seal material 40.

A partition portion 24 surrounding the display area E is provided between the seal material 40 and the display area E. The partition portion 24 is substantially rectangular with two sides along the Y-axis and two other sides along the X-axis. The scanning line drive circuits 102 are planarly superimposed and disposed at the two sides along the Y-axis, respectively. The two scanning line drive circuits 102 are electrically coupled via a wiring line 107. The inspection circuit 103 is planarly superimposed and disposed at one side in the Y plus direction, of the two sides along the X-axis. The inspection circuit 103 is electrically coupled to a data line to be described later.

The data line driving circuit 101 and the two scanning line drive circuits 102 are electrically coupled to the external coupling terminal 104. Vertical conductive portions 106 are provided at four corners of the counter substrate 20, respectively.

As illustrated in FIG. 2, a liquid crystal layer 50 is encapsulated in a region surrounded by the element substrate 10, the counter substrate 20, and the seal material 40. The liquid crystal layer 50 as an electro-optical material contains liquid crystal having positive or negative dielectric anisotropy. The element substrate 10 includes a first base material 10*a*, the transistor 30, a pixel electrode 15, and a first oriented film 28, and these configurations are provided in the order described above from the first base material 10*a* toward the liquid crystal layer 50. Note that, details of the configuration of the element substrate 10 will be described hereafter.

The counter substrate 20 includes a second base material 20*a*, the partition portion 24, an insulating layer 25, a counter electrode 21, and a second oriented film 32, and these are provided in the order described above from the second base material 20*a* toward the liquid crystal layer 50.

The insulating layer 25 is formed of a transmissive inorganic material, such as silicon oxide, for example. Note that, in the present exemplary embodiment, "transmissive" refers to a transmittance of visible light of not less than 50%.

The counter electrode 21 is a common electrode, and formed of a transmissive transparent conductive film, such as an indium tin oxide (ITO) or an indium zinc oxide (IZO), for example. The counter electrode 21 is electrically coupled to the element substrate 10 via the above-described vertical conductive portions 106.

An inorganic oriented film such as silicon oxide or an organic oriented film such as polyimide is used for the first oriented films 28 and 22. A transmissive substrate such as a glass substrate or a quartz substrate, for example, is used for the first base material 10*a* and the second base material 20*a*.

The liquid crystal display device 100 is of a transmission type, and light L is incident from the element substrate 10, and is emitted from the counter substrate 20 via the liquid crystal layer 50. Note that, a configuration may be adopted in which the light L is incident from the counter substrate 20, and is emitted from the element substrate 10. A normally-white mode or a normally-black mode optical design is employed for the liquid crystal display device 100. The liquid crystal display device 100 may include polarizing elements on an incident side and an emission side of the light L.

Figure 3:
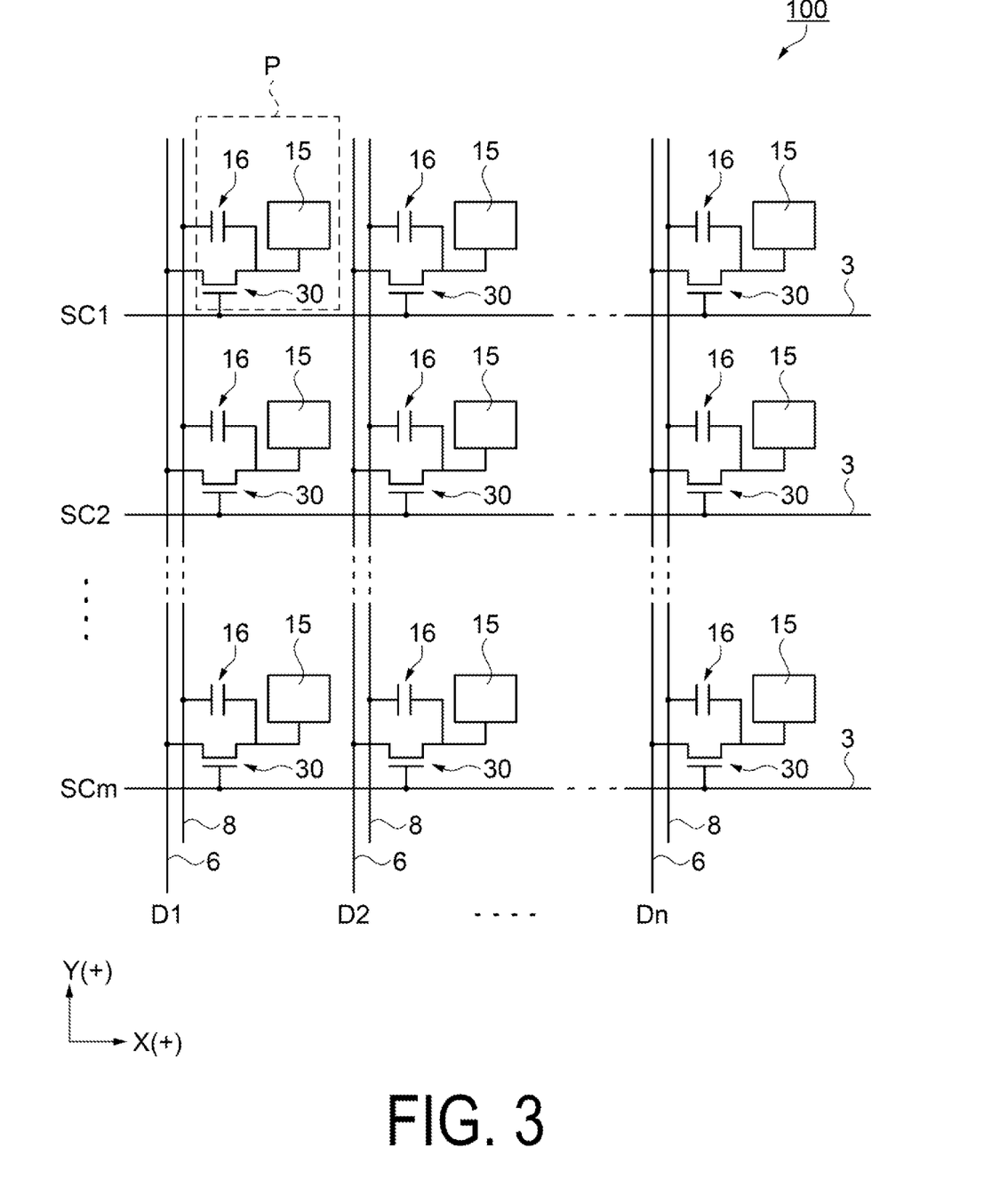
FIG. 3 is an equivalent circuit diagram illustrating an electrical configuration of the liquid crystal display device.

FIG. 3 is an equivalent circuit diagram illustrating an electrical configuration of the liquid crystal display device.

As illustrated in FIG. 3, the liquid crystal display device 100 includes a plurality of data lines 6, scanning lines 3, and capacitance lines 8, as signal wiring lines insulated from each other in the display area E. The scanning line 3 extends along the X-axis, and the data line 6 and the capacitance line 8 extend along the Y-axis.

The pixel electrode 15, the transistor 30, and a capacitance element 16 are provided in a region defined by the scanning line 3, the data line 6, and the capacitance line 8 for each pixel P, and constitute a pixel circuit of the pixel P.

The scanning line 3 is electrically coupled to a gate of the transistor 30 being a switching element. The data line 6 is electrically coupled to a data line side source drain area of the transistor 30. The scanning line 3 simultaneously controls on and off of the transistors 30 provided in the same row. The pixel electrode 15 is electrically coupled to a pixel electrode side source drain area of the transistor 30.

The data lines 6 are coupled to the data line driving circuit 101 described above (see FIG. 1), and supply image signals D1 to Dn supplied from the data line driving circuit 101 to the pixels P. The image signals may be line-sequentially supplied to the data lines 6, or may be supplied to the plurality of data lines 6 adjacent to each other as a group.

The scanning lines 3 are electrically coupled to the scanning line drive circuit 102 (see FIG. 1), and supply scanning signals SC1 to SCm supplied from the scanning line drive circuit 102 to the pixels P. The scanning signals are line-sequentially supplied to the scanning lines 3 in a pulsing manner at predetermined timing.

The transistor 30 is brought into an on state for a certain period by input of the scanning signal, and the image signal is written to the pixel electrode 15 at predetermined timing. The image signal is written to the liquid crystal layer 50 at a predetermined level via the pixel electrode 15, and is retained for a certain period between the pixel electrodes 15 and the counter electrode 21 with the liquid crystal layer 50 interposed therebetween. In order to prevent the retained image signal from leaking, the capacitance element 16 is electrically coupled in parallel to a liquid crystal capacitor provided between the pixel electrode 15 and the counter electrode 21.

Figure 4:
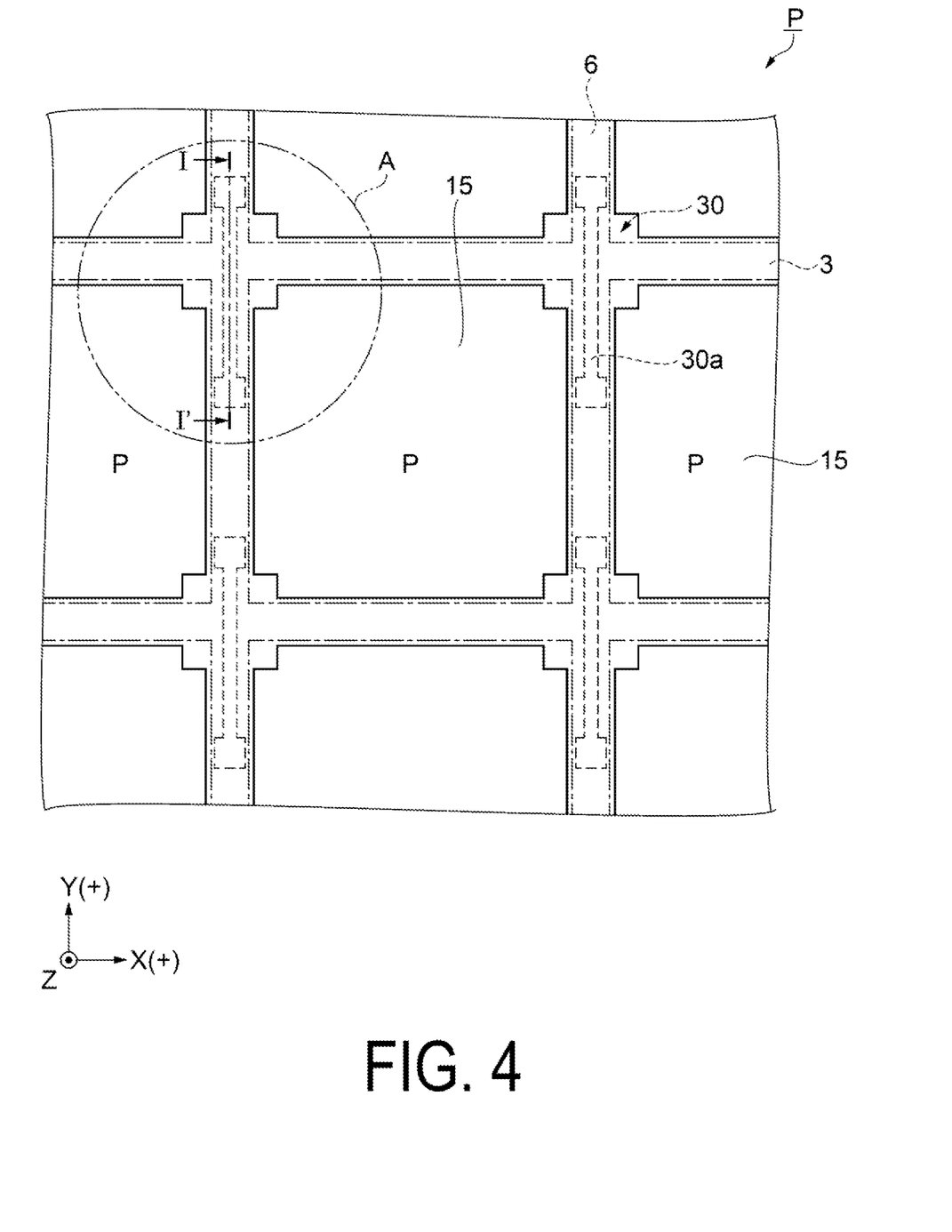
FIG. 4 is a plan view illustrating a schematic configuration of a pixel.

FIG. 4 is a plan view illustrating a configuration of the pixel.

In FIG. 4, a solid line indicates a boundary line between a light shielding area shaded by light shielding members such as the scanning line 3 and the data line 6, and a light transmission area through which the light L passes. A dot-dash line indicates an outer edge of the pixel electrode 15. A dotted line indicates an outer edge of a semiconductor layer of the transistor 30. Note that, the light transmission area corresponds to an opening area, and the light shielding area corresponds to a non-opening area, and a ratio of the opening area in the pixel P in the display area E is referred to as an opening ratio. The narrower the light shielding area in the pixel P, the greater the opening ratio, and a bright electro-optical device can be realized. The data line 6 and the scanning line 3 are disposed between the pixel electrode 15 and the pixel electrode 15 adjacent to each other in the pixel P. A grid-shaped portion along the scanning lines 3 and the data lines 6 serves as the light shielding area. Then, the transistor 30 is disposed along a side between an intersection and an intersection in the grid-shaped light shielding area.

Basic Stack Structure Around Pixel

Figure 5:
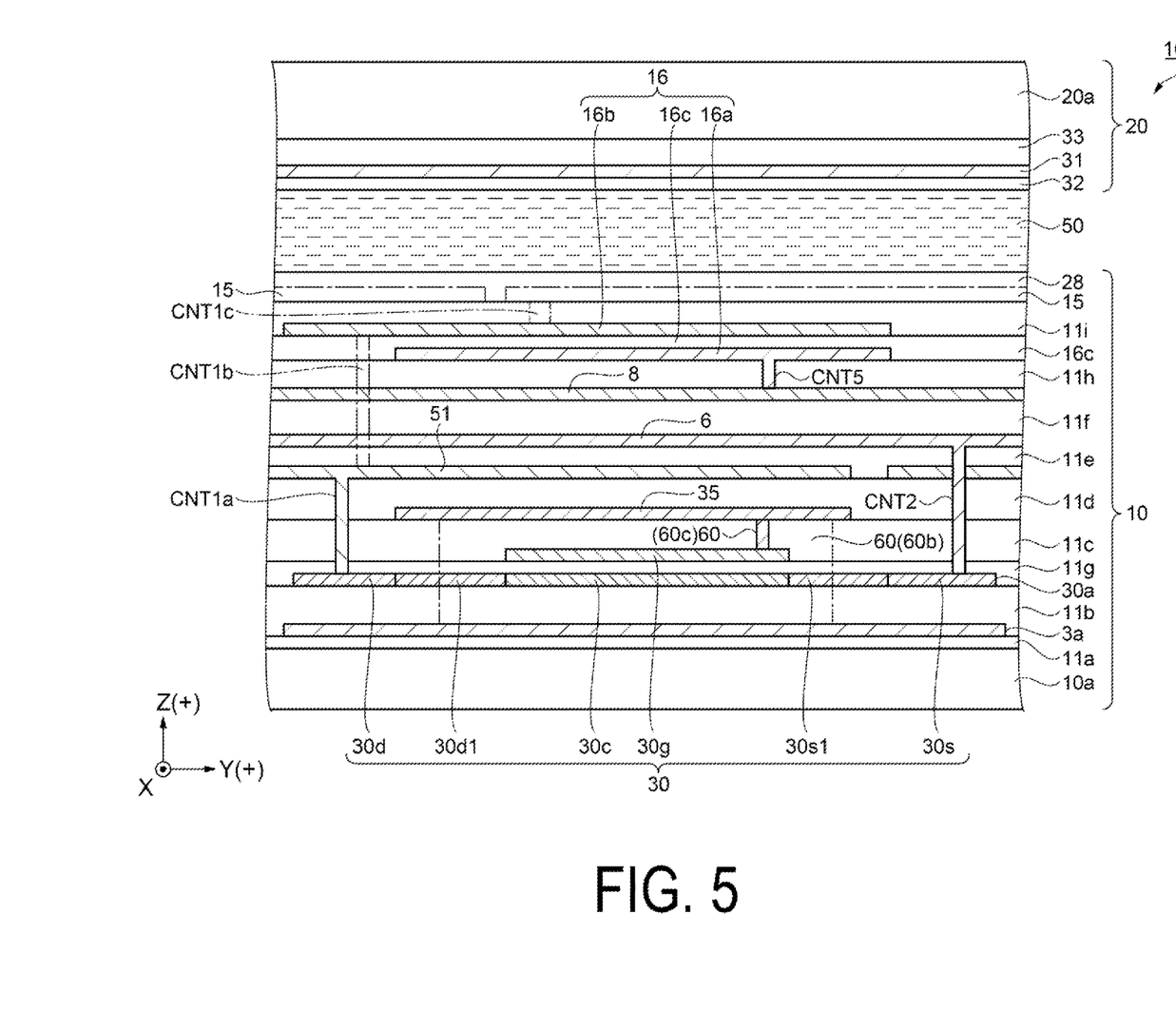
FIG. 5 is a side cross-sectional view taken along an I-I' cross-section in FIG. 4.

FIG. 5 is a side cross-sectional view taken along the I-I' cross section in FIG. 4, and is a diagram in which the I-I' cross-section is viewed in a direction of arrows. In FIG. 5, conductive material members such as a wiring line, a relay electrode, and a pixel electrode appearing in the cross section are hatched, but insulating material members such as a substrate and an insulating layer are not hatched for ease of viewing. In addition, a main configuration that does not appear in the cross section is described by a dot-dash line.

As illustrated in FIG. 5, the liquid crystal display device 100 includes the element substrate 10 and the counter substrate 20 disposed opposite thereto. The first base material 10a constituting the element substrate 10 is quartz, for example. The element substrate 10 includes the scanning line 3, the transistor 30, the data line 6, the capacitance element 16, the pixel electrode 15, and the first oriented film 28, above the first base material 10a.

Specifically, an insulating layer 11a made of silicon oxide or the like is disposed above the first base material 10a. The scanning line 3 that also functions as a light shielding layer made of tungsten silicide (WSi) or the like is disposed above the insulating layer 11a.

An insulating layer 11b made of silicon oxide or the like is disposed above the scanning line 3 and the insulating layer 11a. The transistor 30 is disposed above the insulating layer 11b.

The transistor 30 has, for example, lightly doped drain (LDD) structure, and includes a semiconductor layer 30a made of polysilicon (high-purity polycrystalline silicon) or the like, a gate insulating layer 11g formed above the semiconductor layer 30a, and a gate electrode 30g (the other of two electrodes) made of aluminum or the like formed above the gate insulating layer 11g.

The semiconductor layer 30a is formed as the transistor 30 of an N-type by being injected with N-type impurity ions such as phosphorus (P) ions, for example. Specifically, the semiconductor layer 30a includes a channel area 30c, a first LDD area 30s1, a source area 30s, a second LDD area 30d1 as an LDD area, and a drain area 30d. Note that, the source area 30s is also referred to as a source terminal 30s, and the drain area 30d is also referred to as a drain terminal 30d.

P-type impurity ions such as boron (B) ions are doped in the channel area 30c. The other regions (30s1, 30s, 30d1, 30d) are doped with N-type impurity ions such as phosphorus (P) ions.

An insulating layer 11c made of silicon oxide or the like is disposed above the gate electrode 30g and the gate insulating layer 11g. A gate wiring line 35 made of aluminum or the like electrically coupled to the gate electrode 30g via a relay conductor part 60 is disposed above the insulating layer 11c. Note that, the gate wiring line 35 is also electrically coupled to the scanning line 3 via the relay conductor part 60. In a preferred example, the relay conductor part 60 is a tungsten plug made of tungsten.

An insulating layer 11d made of silicon oxide or the like is disposed above the gate wiring line 35 and the insulating layer 11c. A relay wiring line 51 made of aluminum or the like electrically coupled to the drain area 30d via a contact hole CNT1a is disposed above the insulating layer 11d. An insulating layer 11e made of silicon oxide or the like is disposed above the relay wiring line 51 and the insulating layer 11d.

The data line 6 electrically coupled to the source area 30s via a contact hole CNT2 is disposed above the insulating layer 11e. An insulating layer 11f made of silicon oxide or the like is disposed above the data line 6 and the insulating layer 11e. The capacitance line 8 is disposed above the insulating layer 11f. An insulating layer 11h as an interlayer insulating layer made of silicon oxide or the like is disposed above the capacitance line 8.

The capacitance element 16 is disposed above the insulating layer 11h. Specifically, the capacitance element 16 is configured by sandwiching a dielectric layer 16c between a first capacitance electrode 16a and a second capacitance electrode 16b. The first capacitance electrode 16a is electrically coupled to the capacitance line 8 via a contact hole CNT5. The second capacitance electrode 16b is electrically coupled to the drain area 30d of the transistor 30 via a contact hole CNT1b, the relay wiring line 51, and the contact hole CNT1a.

An insulating layer 11i made of silicon oxide or the like is disposed above the capacitance element 16. The pixel electrode 15 electrically coupled to the second capacitance electrode 16b via a contact hole CNT1c is formed above the insulating layer 11i. The pixel electrode 15 is, for example, a transparent conductive film such as ITO.

The first oriented film 28 at which an inorganic material such as silicon oxide is obliquely deposited is disposed above the pixel electrode 15. The liquid crystal layer 50 obtained by encapsulating liquid crystal or the like in a space enclosed by the seal material 40 (FIG. 2) is disposed above the first oriented film 28.

On the other hand, the counter substrate 20 includes an insulating layer 33, a counter electrode 31, and the second oriented film 32 above the second base material 20a (liquid crystal layer 50 side). The second base material 20a is quartz, for example. The insulating layer 33 is formed of silicon oxide, for example. The counter electrode 31 is, for example, a transparent conductive film such as ITO. The second oriented film 32 is formed by obliquely depositing an inorganic material such as silicon oxide.

The liquid crystal layer 50 is brought into a predetermined oriented state by the first oriented film 28 and the second oriented film 32 in a state where no electric field is generated between the pixel electrode 15 and the counter electrode 31.

About Planar Wiring Layout

Figure 6:
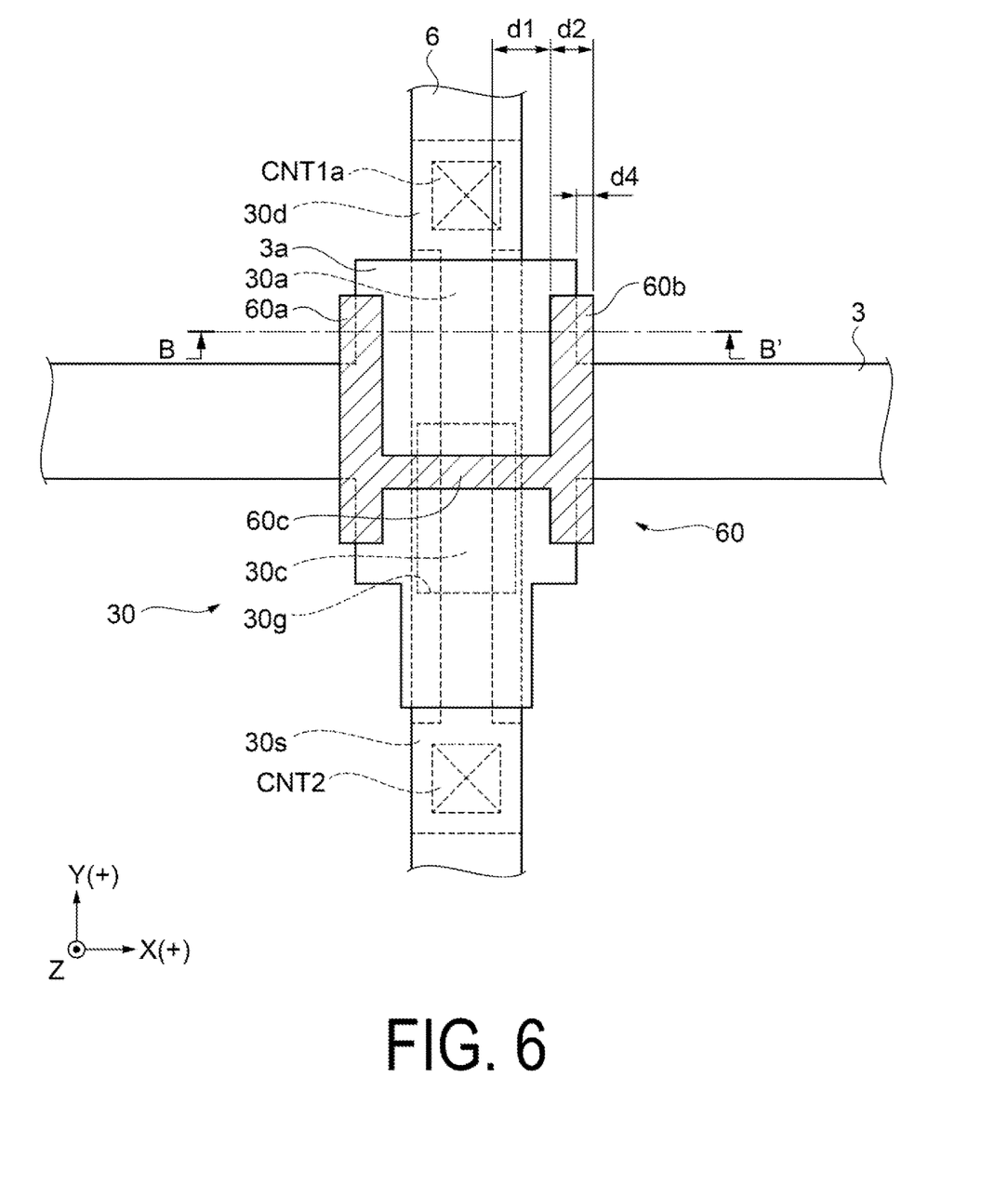
FIG. 6 is an enlarged plan view of a part A in FIG. 4.
Figure 7:
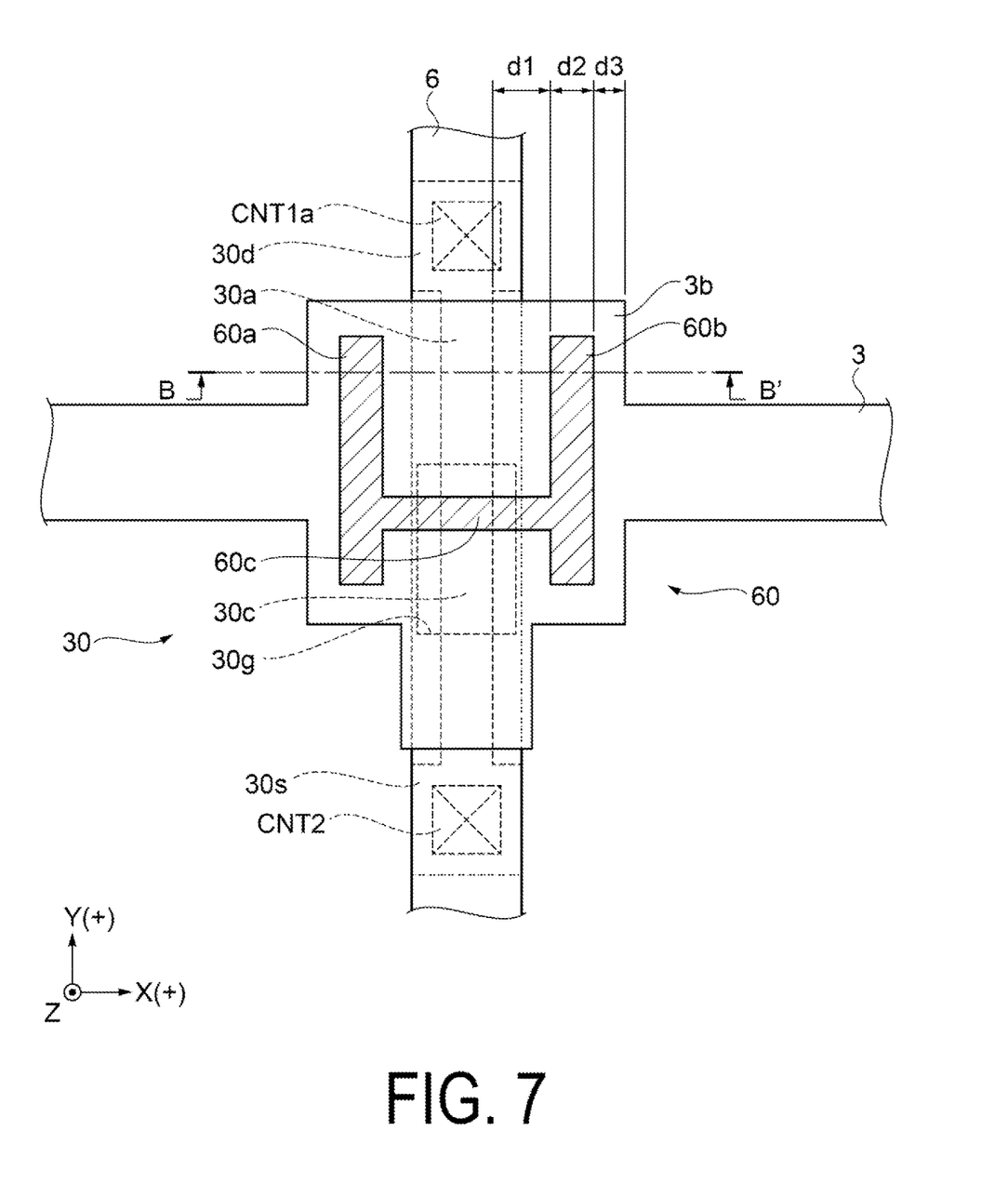
FIG. 7 is an enlarged plan view of a vicinity of a transistor in a comparison example.

FIG. 6 is an enlarged view of the part A surrounded by a double dot chain line in FIG. 4, and is an enlarged plan view of a vicinity of the transistor 30. FIG. 7 is an enlarged plan view of a vicinity of the transistor 30 in a comparison example, and corresponds to FIG. 6.

Here, a wiring layout that enables a high opening ratio in the present exemplary embodiment will be described in comparison with a wiring layout of the comparison example illustrated in FIG. 7.

First, the wiring layout of the comparison example illustrated in FIG. 7 will be described. Note that, in FIG. 7, in order to facilitate understanding of a wiring aspect, the scanning line 3 as a first conductive layer, and the relay conductor part 60 including a first conductor part and a second conductor part are mainly described. Note that, the gate wiring line 35 as a second conductive layer not illustrated in FIG. 7 will be described later. As illustrated in FIG. 7, the relay conductor part 60 has a substantially H shape in plan view, and a first part 60a as the first conductor part extending along the Y-axis, and a second part 60b as the second conductor part are disposed sandwiching the semiconductor layer 30a.

The first part 60a and the second part 60b provided at both side surfaces of the semiconductor layer 30a, respectively, are electrically coupled by a coupling portion 60c that extends along the X-axis. The coupling portion 60c is disposed to overlap the gate electrode 30g in the semiconductor layer 30a. Specifically, the first part 60a and the second part 60b are coupled to each other across a lower layer of the gate electrode 30g.

In the wiring design of the comparison example, a mounting part of the relay conductor part 60 in the scanning line 3 was provided with a protruding part 3b protruding toward a center side of pixel P, and a shape of the protruding part 3b was set to be one size greater than an outer shape of the relay conductor part 60. Specifically, as illustrated in FIG. 7, when, in the X plus direction, a distance from semiconductor layer 30a to the second part 60b of the relay conductor part

60 is a distance d1, a width of the second part 60b is a distance d2, and a distance from the second part 60b to an outer edge of the protruding part 3b of the scanning line 3 is a distance d3, the outer edge of the protruding part 3b of the scanning line 3 was set to be greater than the outer shape of the relay conductor part 60 by the distance d3. In other words, the relay conductor part 60 was set to fall within the mounting part of the scanning line 3. Further, the same applies to the X minus direction, and the outer edge of the protruding part 3b of the scanning line 3 was provided outside the outer shape of the relay conductor part 60.

In contrast, in the wiring design in the present exemplary embodiment illustrated in FIG. 6, a shape of the protruding part 3a of a mounting part of the relay conductor part 60 in the scanning line 3 is smaller in width than that of the comparison example. Specifically, in the X plus direction, an outer edge of the protruding part 3a of the scanning line 3 is inside the second part 60b of the relay conductor part 60, and the relay conductor part 60 protrudes from a mounting part of the protruding part 3a of the scanning line 3. Note that, a size of the relay conductor part 60 is the same as that of the comparison example. In other words, in plan view, the outer edge of the protruding part 3a of the scanning line 3 enters inside the second part 60b by a distance 4d, and overlaps the second part 60b of the relay conductor part 60.

Furthermore, the same applies to the X minus direction, the outer edge of the scanning line 3 is inside the first part 60a of the relay conductor part 60, and the relay conductor part 60 protrudes from a mounting part of the scanning line 3.

As the preferred example in the present exemplary embodiment, a part of a non-opening area is defined by the scanning line 3, and therefore, an opening area is widened due to a decreased width of the mounting part of the scanning line 3. Specifically, the scanning line 3, and an edge of the relay conductor part 60 that protrudes from the scanning line 3 define the opening area of the pixel P (FIG. 4).

Note that, misalignment of the relay conductor part 60, which is assumed due to a manufacture tolerance, is at most approximately half the width of the first part 60a or the second part 60b. For example, when the relay conductor part 60 is shifted in the X plus direction, the second part 60b is disposed slightly overlapping the edge of the mounting part of the scanning line 3, but a light shielding property is not impaired, on the other hand, the first part 60a is disposed such that almost all thereof overlaps the mounting part of the scanning line 3, and an electrical coupling area is sufficiently ensured. Furthermore, even when the misalignment occurs, the coupling portion 60c is constantly positioned above the mounting part of the scanning line 3, so the electrical coupling area is sufficiently ensured.

Figure 8:
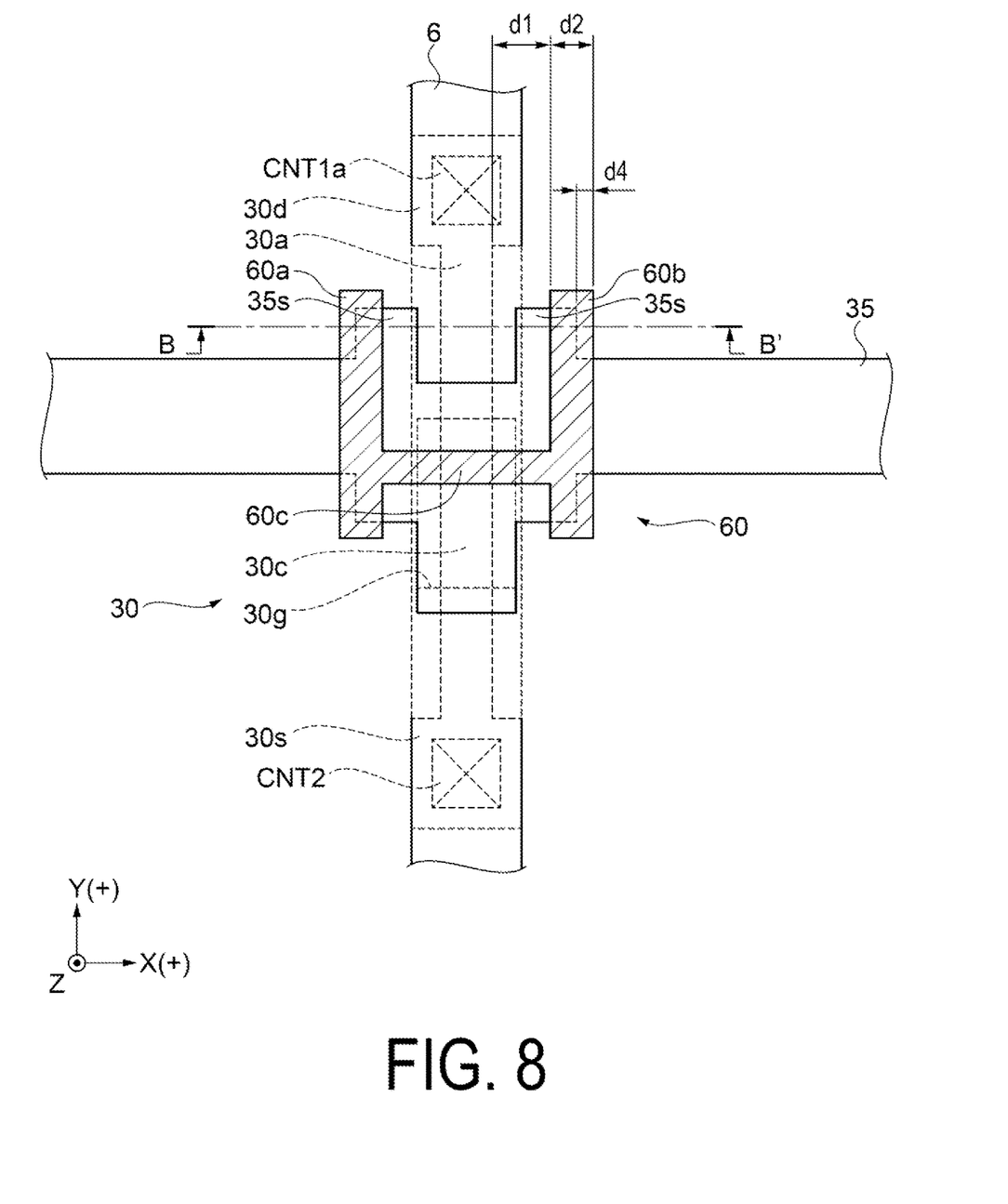
FIG. 8 is an enlarged plan view of a vicinity of a transistor.

FIG. 8 is an enlarged plan view of a vicinity of the transistor 30 mainly depicting a gate wiring line and a relay conductor part, and corresponds to FIG. 6.

Here, a wiring aspect of the gate wiring line 35 as the second conductive layer on an upper layer side of the semiconductor layer 30a will be described using FIGS. 8 and 6.

As illustrated in FIG. 8, the gate wiring line 35 also includes a part extending along the X-axis similar to the scanning line 3, but is not continuous and is independent like an island. In addition, a shape of a part of the gate wiring line 35 that covers the relay conductor part 60 is substantially the same shape as the mounting part of the scanning line 3, but a part on the drain terminal 30d side is notched in a concave shape. Furthermore, the part of the gate wiring line 35 that covers the relay conductor part 60 has a protruding part 35s that protrudes toward a center side of the pixel P.

In the X plus direction, an outer edge of the protruding part 35s of the gate wiring line 35 enters inside the second part 60b of the relay conductor part 60 by the distance d4, and the relay conductor part 60 protrudes from a part of the protruding part 35s of the scanning line 3. Similarly, also in the X minus direction, the outer edge of the protruding part 35s of the gate wiring line 35 is inside the first part 60a of the relay conductor part 60, and the relay conductor part 60 protrudes from a part of the protruding part 35s of the gate wiring line 35.

Note that, in the preferred example, a width of the gate wiring line 35 and the shape of the part that covers the relay conductor part 60 are set to be the same as or smaller than a width of the scanning line 3 and the mounting part of the relay conductor part 60. That is, when both are overlaid, the gate wiring line 35 falls within an outer shape of the scanning line 3, and an outermost shape of the non-opening area is defined by the scanning line 3. In other words, the scanning line 3 defines the opening area of the pixel P (FIG. 4).

Three-Dimensional Wiring Layout and Light Shielding Structure

Figure 9:
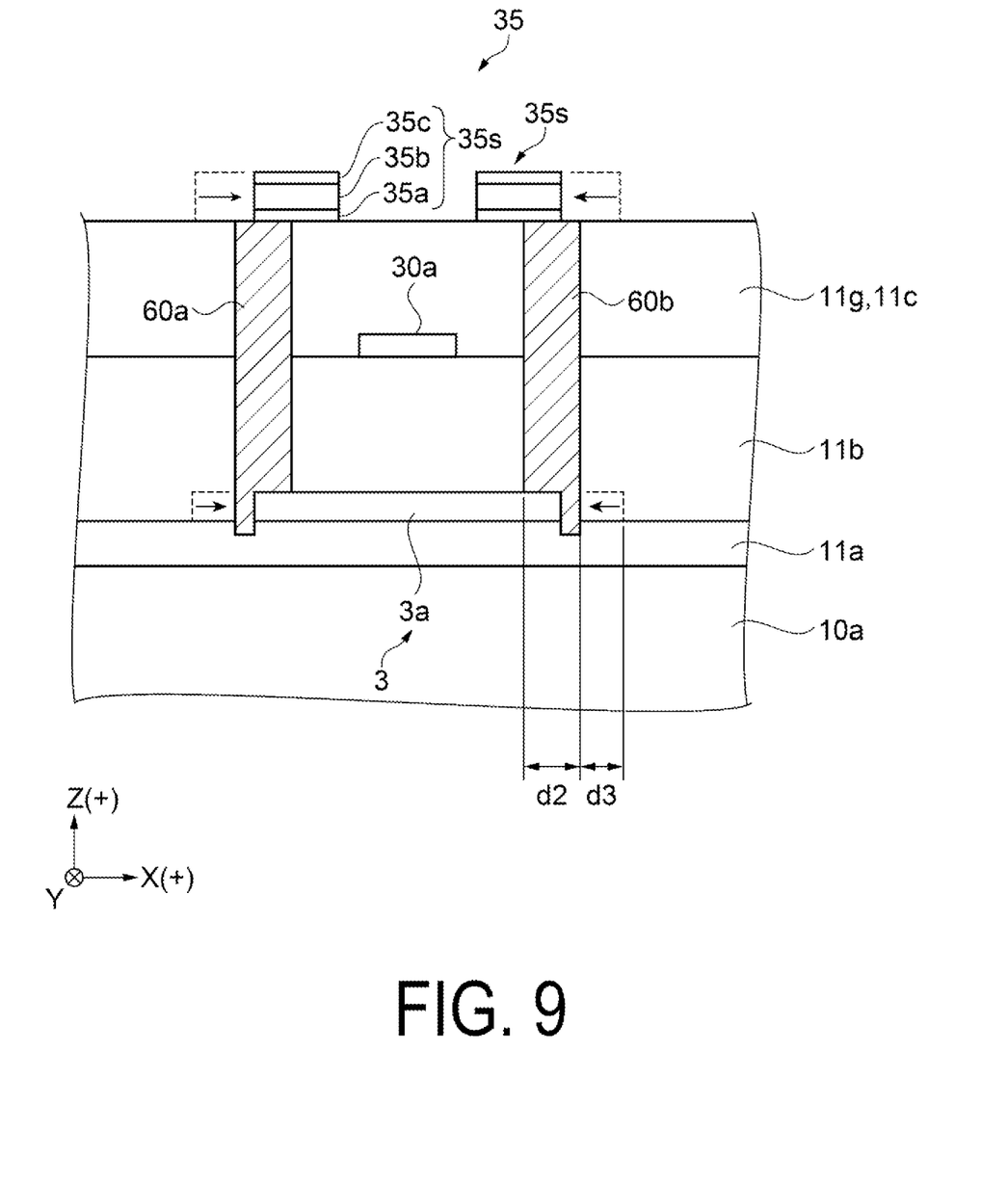
FIG. 9 is a side cross-sectional view taken along a B-B' cross section in FIG. 6.

FIG. 9 is a cross-sectional view taken along the B-B' cross section of FIGS. 6 and 8, and is a diagram in which the B-B' cross section is viewed toward a direction of arrows.

As illustrated in FIG. 9, the scanning line 3 is disposed in a lower layer of the semiconductor layer 30a, and the gate wiring line 35 is disposed in an upper layer. Note that, since FIG. 9 is a cross section on the drain terminal 30d side, the gate wiring line 35 is divided into two portions, but the gate wiring line 35 is continuously provided in a solid state in a part overlapping the gate electrode 30g. In addition, the first part 60a and the second part 60b of the relay conductor part 60 are disposed at both side surfaces of semiconductor layer 30a, respectively. In this manner, the semiconductor layer 30a of the register 30 is disposed at a position surrounded from four directions by the scanning line 3, the gate wiring line 35, the first part 60a, and the second part 60b of the relay conductor part 60.

A part of each of the first part 60a and the second part 60b that protrudes from the protruding part 3a of the scanning line 3 is disposed along a side surface of the protruding part 3a of the scanning line 3. This is because, when contact holes for forming the first part 60a and the second part 60b are formed by etching in the insulating layer l1b, the gate insulating layer 11g, and the insulating layer 11c, holes are formed along the side surface of the protruding part 3a of the scanning line 3 by over-etching, and the relay conductor part 60 is formed also in the holes.

In this manner, the upper gate wiring lines 35, the lower scanning lines 3, the first part 60a, and the second part 60b of the relay conductor part 60 on both the side surfaces in the semiconductor layer 30a constitute light shielding structure that three-dimensionally surrounds the transistor 30.

In addition, as illustrated in FIG. 9, the outer edge of the protruding part 3a of the scanning line 3 is smaller than the outer edge of the comparison example indicated by a dotted line, and enters the second part 60b of the relay conductor part 60, but a part where the both overlap is ensured, thus light shielding performance equivalent in the configuration of the comparison example is provided. The same applies to the first part 60a side.

The outer edge of the protruding part 35s of the gate wiring line 35 is smaller than the outer edge of the comparison example indicated by a dotted line, and enters the second part 60*b* of the relay conductor part 60, but a part where the both overlap is ensured, and thus light shielding performance equivalent in the configuration of the comparison example is provided. The same applies to the first part 60*a* side.

Then, the non-opening area in FIG. 9 is defined by the outer shape of the relay conductor part 60, and therefore, is decreased by the distance d3, thereby widening the opening area.

Different Disposition Aspect of Scanning Line and Gate Wiring Line

Description will be given with reference to FIGS. 6 to 9.

In the above description, the configuration in which the scanning line 3 is disposed in the lower layer of the transistor 30, and the gate wiring line 35 is disposed in the upper layer has been described, but the present disclosure is not limited to this configuration, and it is sufficient that a configuration is adopted in which electrical coupling, light shielding performance, and a high opening ratio can be ensured.

For example, a configuration may be adopted in which the upper and lower wiring lines are switched so that the gate wiring line 35 is disposed in the lower layer of the transistor 30, and the scanning line 3 is disposed in the upper layer. In this case, the gate wiring line 35 serves as the second conductive layer, and is disposed in an island shape in the lower layer of the transistor 30, as illustrated in FIG. 8. In addition, the scanning line 3 serves as the first conductive layer, and is provided continuously along an extension direction of the X-axis in the upper layer of the transistor 30, as illustrated in FIG. 6.

This configuration is also a three-dimensional configuration in which the scanning line 3 and the gate wiring line 35 are switched in FIG. 9, and as described above, light shielding structure that surrounds the transistor 30 from four directions is configured. Additionally, in the preferred example, the non-opening area is defined by the scanning line 3, and thus, similar to the above, the opening area can be widened.

Details of Method for Forming Relay Conductor Part and Gate Wiring Line

Description will be given with reference to FIG. 9.

As described above, in the preferred example, the relay conductor part 60 is a so-called tungsten plug formed of tungsten.

Here, a method of forming the relay conductor part 60 will be briefly described.

First, a contact hole is formed by performing an etching process at a position where the relay conductor part 60 is formed in stack structure including the insulating layer lib, the gate insulating layer 11*g*, and the insulating layer 11*c*.

Next, a tungsten film is formed by a chemical vapor deposition (CVD) method, and the contact hole is filled. Then, by using a chemical mechanical polishing (CMP) method to polish a surface and leaving tungsten only in the contact hole, the relay conductor part 60 is formed as illustrated in FIG. 9.

Then, the gate wiring line 35 coupled to the relay conductor part 60 has three-layer structure in the preferred example. Specifically, the gate wiring line 35 has three-layer structure including a titanium nitride (TiN) layer 35*a*, an aluminum (Al) layer 35*b*, and a titanium nitride (TiN) layer 35*c*. The titanium nitride layer 35*a* is a barrier layer for the relay conductor part 60 made of tungsten, and is provided to increase adhesion between the two and reduce coupling resistance. Note that, the barrier layer is not limited to TiN, but it is sufficient to use a substance having a similar function, and for example, titanium (Ti) or tungsten nitride (WN) may be used.

Note that, for example, also when the scanning line 3 is formed of a material other than tungsten such as aluminum, a barrier layer may be similarly provided between the scanning line 3 and the relay conductor part 60. Additionally, a barrier layer may also be provided at a side surface of the relay conductor part 60 that is in contact with the insulating layer 11*b*, the gate insulating layer 11*g*, and the insulating layer 11*c* made of silicon oxide.

As described above, the following advantages can be obtained according to the liquid crystal display device 100 of the present exemplary embodiment.

The liquid crystal display device 100 includes the pixel P, the transistor 30 for switching the pixel P, the relay conductor part 60 provided along both the side surfaces of the transistor 30 in the cross-sectional view, the scanning line 3 as the first conductive layer provided in the lower layer, and the gate wiring line 35 as the second conductive layer provided in the lower layer of the transistor 30 in the cross-sectional view, the scanning line 3 and the gate wiring line 35 are electrically coupled via the relay conductor part 60, and the edge of the scanning line 3 overlaps the relay conductor part 60 in plan view. In other words, the edge of relay conductor part 60 forms a part of the boundary between the light shielding area and the light transmission area.

According to this configuration, the transistor 30 is surrounded from the four directions by the light shielding structure including the upper gate wiring line 35, the lower scanning line 3, the first part 60*a* as the first conductor part and the second part 60*b* as the second conductor part of the relay conductor part 60 on both the respective side surfaces, and the like. Furthermore, the edge of the scanning line 3 overlaps the relay conductor part 60 in plan view, that is, the scanning line 3 defining the opening area is formed narrower than that of the comparison example, thus the opening area is widened. Specifically, the non-opening area in FIG. 9 is defined by the outer shape of the relay conductor part 60, and therefore, is decreased by the distance d3, thereby widening the opening area. In a part defined by the outer shape of the scanning line 3, the opening area is further widened by the distance d4. Accordingly, the liquid crystal display device 100 with an improved opening ratio while the light shielding property is secured can be provided.

In the preferable example, the second conductive layer is the scanning line 3 formed in the lower layer of the transistor 30, and the first conductive layer is the island shaped gate wiring line 35 formed in the upper layer of the transistor 30.

Alternatively, the second conductive layer may be an island shaped gate wiring line formed in the lower layer of the transistor 30, and the first conductive layer may be the scanning line 3 formed in the upper layer of the transistor.

In either configuration, the liquid crystal display device 100 with an improved opening ratio while the light shielding property is secured can be provided.

In addition, the scanning line 3 and the edge of the relay conductor part 60 protruding from the scanning line define the opening area of the pixel P, in plan view.

With this, the opening area is defined by the scanning line 3 that is narrower than that of the comparison example, so the opening ratio can be increased.

In addition, the relay conductor part 60 has the coupling portion 60*c* that couples the first part 60*a* and the second part 60*b* on both the respective side surfaces, and is substantially H shaped in plan view.

With this, the first part 60a and the second part 60b that function as light shielding walls on both the respective side surfaces of the transistor 30 can be electrically coupled to each other.

Furthermore, the relay conductor part 60 is made of tungsten.

With this, the relay conductor part 60 having excellent electrical coupling reliability and the light shielding property can be formed.

Further, the barrier layer is provided between the relay conductor part 60 and the gate wiring line 35.

With this, the adhesion of the two is improved, the coupling resistance is reduced, and the coupling reliability is improved.

Exemplary Embodiment 2

Different Aspect of Wiring Layout

Figure 10:
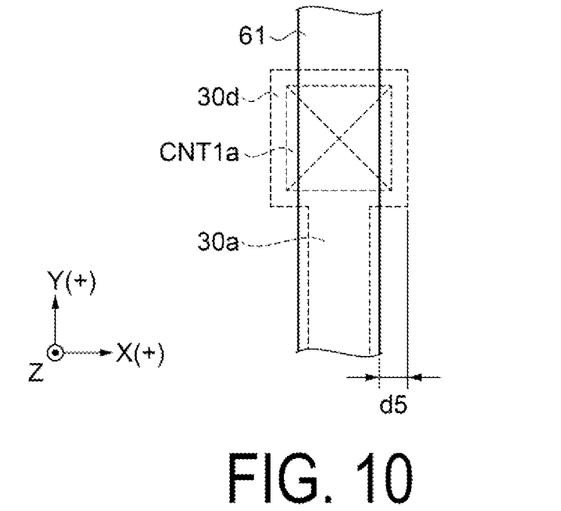
FIG. 10 is a diagram illustrating an aspect with a different wiring layout according to Exemplary Embodiment 2.

FIG. 10 is a diagram illustrating a different aspect of the wiring layout, and corresponds to FIG. 6.

FIG. 10 is an enlarged view of a vicinity of the drain terminal 30d of FIG. 6, but a wiring aspect of a data line 61 is different from that of FIG. 6. Note that, the same reference signs are attached to the same sites as described above, and redundant descriptions thereof will be omitted.

In the above exemplary embodiment, the case has been described in which the opening ratio is increased by reducing the vertical wiring pattern in the relay conductor part 60, but the present disclosure is not limited to this configuration, and can also be applied to a vertical contact portion provided in a non-opening area.

For example, the present disclosure can be applied to the data line 61 in the upper layer in the contact hole CNT1a of the drain terminal 30d illustrated in FIG. 6. Specifically, the data line 61 is formed with a narrower line width than that of the data line 6 in FIG. 6. The data line 61 is set to be narrow by a distance d5 on one side, thus is narrower by 2×d5 in total, thereby widening the opening area. Note that, the present disclosure is not limited to the contact holes CNT1a, and can be similarly applied to the other vertical contact portion provided in the non-opening area.

Exemplary Embodiment 3

Different Disposition Aspect of Transistor

Figure 11:
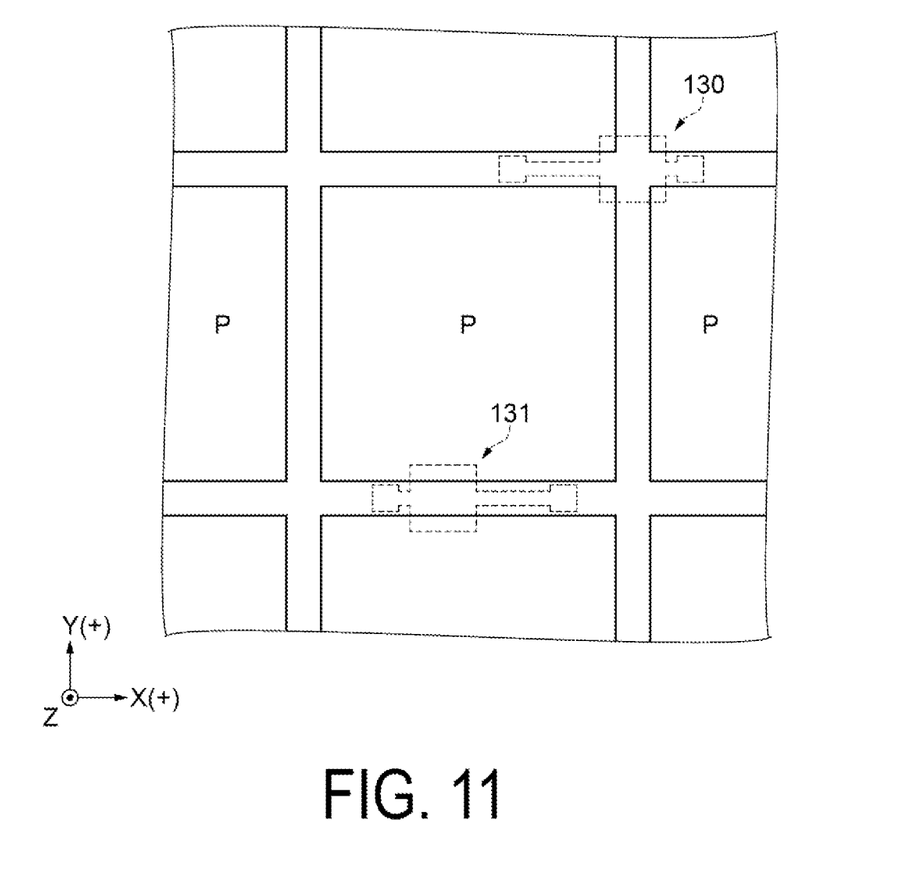
FIG. 11 is a diagram illustrating a different disposition aspect of transistors according to Exemplary Embodiment 3.

FIG. 11 is a diagram illustrating a different disposition aspect of the transistors, and corresponds to FIG. 4.

In each of the exemplary embodiments described above, as illustrated in FIG. 4, the description has been given in which the semiconductor layer 30a including the transistor 30 is placed vertically along the extension direction of the Y-axis at the intersection in the non-opening area between the adjacent pixels P, but the present disclosure is not limited to this configuration, and the semiconductor layer 30a may be disposed at any place as long as the place is a non-opening area. Note that, the same reference signs are attached to the same sites as described above, and redundant descriptions thereof will be omitted.

For example, as in FIG. 11, a configuration may be adopted in which a semiconductor layer 130 is placed at an intersection in a non-opening area between the adjacent pixels P, laterally along the extension direction of the Y-axis. In other words, a pixel transistor may be placed vertically or laterally, as long as the pixel transistor is disposed at a position corresponding to a vertex of the pixel P in the non-opening area between the adjacent pixels P. Alternatively, a configuration may be adopted in which, a semiconductor layer 131 is disposed overlapping the non-opening area along a side of the pixel P. Even with this disposition aspect, an opening ratio can be improved by reducing a wiring pattern to be coupled in a relay conductor part or a vertical coupling portion, similar to the exemplary embodiments described above.

Exemplary Embodiment 4

Projector as Electronic Apparatus

Figure 12:
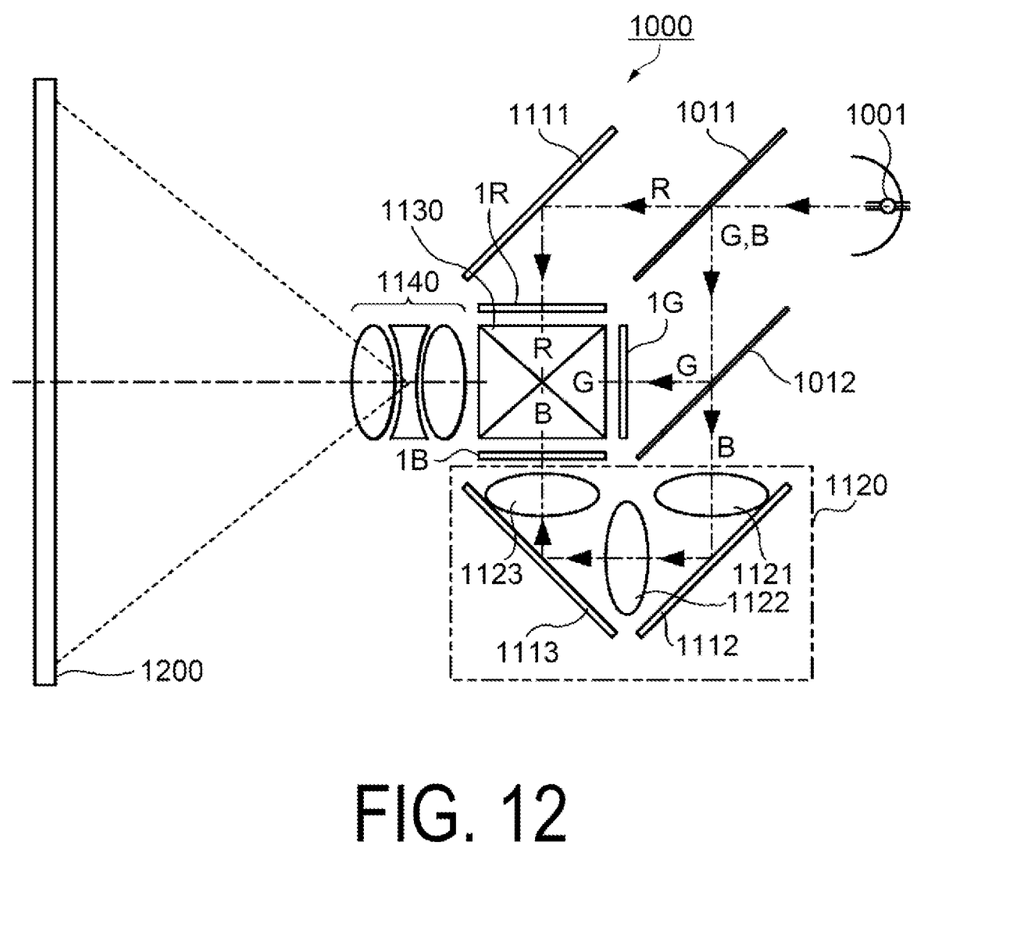
FIG. 12 is a schematic configuration view of a projection-type display device according to Exemplary Embodiment 4.

FIG. 12 is a schematic configuration view illustrating a projection-type display device.

Here, a projection-type display device 1000 as an electronic apparatus according to the present exemplary embodiment will be described.

The projection-type display device 1000 illustrated in FIG. 12 is a liquid crystal type projector.

The projection-type display device 1000 includes a lamp unit 1001 as a light source, dichroic mirrors 1011, 1012 as a color separation optical system, three liquid crystal devices 1B, 1G, 1R as an optical modulation device, three reflection mirrors 1111, 1112, 1113, three relay lenses 1121, 1122, 1123, a dichroic prism 1130 as a color synthesis optical system, and a projection lens 1140 as a projection optical system.

In the lamp unit 1001, for example, a discharge type light source is employed. The method of the light source is not limited thereto, and a solid light source such as a light emitting diode, laser, or the like may be employed.

Light emitted from the lamp unit 1001 is separated by the two dichroic mirrors 1011 and 1012 into three colors of light in respective different wavelength ranges. The three colors of light are substantially red light, substantially green light, and substantially blue light. In the following description, the substantially red light is also referred to as red light R, the substantially green light is also referred to as green light G, and the substantially blue light is also referred to as blue light B".

The dichroic mirror 1011 transmits the red light R, and reflects the green light G and the blue light B, which are shorter in wavelength than the red light R. The red light R transmitted through the dichroic mirror 1011 is reflected by the reflection mirror 1111, and is incident on a liquid crystal device 1R. The green light G reflected by the dichroic mirror 1011 is reflected by the dichroic mirror 1012, and is then incident on a liquid crystal device 1G. The blue light B reflected by the dichroic mirror 1011 is transmitted through the dichroic mirror 1012, and is emitted to a relay lens system 1120.

The relay lens system 1120 includes the relay lenses 1121, 1122, 1123, and the reflection mirrors 1112 and 1113. Since a light path of the blue light B is longer compared to the green light G and the red light R, luminous flux tends to increase. Therefore, an increase in the luminous flux is suppressed using the relay lens 1122. The blue light B incident on the relay lens system 1120 is reflected by the reflection mirror 1112, and is focused in a vicinity of the relay lens 1122 by the relay lens 1121. Then, the blue light B is incident on the liquid crystal device 1B via the reflection mirror 1113 and the relay lens 1123.

The liquid crystal display device 100 as an electro-optical device of Exemplary Embodiment 1 is applied to the liquid crystal devices 1R, 1G, and 1B, which form the optical modulation device, in the projection-type display device 1000.

Each of the liquid crystal devices 1R, 1G, and 1B is electrically coupled to an upper circuit of the projection-type display device 1000. In the upper circuit, image signals specifying gray scale levels of the red light R, the green light G, and the blue light B supplied from an external circuit are processed, and the liquid crystal devices 1R, 1G, and 1B are driven to perform displaying.

The red light R, the green light G, and the blue light G modulated by the liquid crystal devices 1R, 1G, and 1B, respectively, are incident on the dichroic prism 1130 from three directions. The dichroic prism 1130 synthesizes the incident red light R, green light G, and blue light B. In the dichroic prism 1130, the red light R and the blue light B are reflected at 90 degrees, and the green light G is transmitted. Therefore, the red light R, the green light G, and the blue light B are synthesized as display light for displaying a color image, and the display light is emitted toward the projection lens 1140. The displayed light is expanded and emitted via the projection lens 1140, and projected onto a screen 1200, which is a projection target.

As described above, in the projection-type display device 1000, the liquid crystal display device 100 with an improved opening ratio while a light shielding property is secured is used as the optical modulation device.

Accordingly, the projection-type display device 1000 can be provided with which a sharpened projection image with less seam feel and without flickering can be obtained.

Note that, in the present exemplary embodiment, the projection-type display device 1000 is illustrated as the electronic apparatus, but an electronic apparatus to which the electro-optical device according to the present disclosure is applied is not limited thereto. For example, the present disclosure may be applied to an electronic apparatus such as a projection-type head-up display (HUD), a direct view type head mounted display (HMD), a personal computer, a digital camera, a liquid crystal television, or the like.

Further, the present disclosure is not limited by the descriptions above, and can be appropriately modified without departing from the gist of the disclosure. Note that, the scale between each of the drawings and the members may be different for ease of understanding.

What is claimed is:

1. An electro-optical device, comprising:
    a light shielding area including:
        a first conductive layer,
        a second conductive layer,
        a first conductor part disposed between the first conductive layer and the second conductive layer and configured to electrically connect the first conductive layer and the second conductive layer, and
        a transistor disposed between the first conductive layer and the second conducive layer and surrounded by the first conductive layer, the second conductive layer, and the first conductor part; and
    a light transmission area surrounded by the light shielding area, wherein
    a part of the first conductor part protrudes from an outer edge of the first conductive layer and protrudes from an outer edge of the second conductive layer in plan view, and
    the part of the first conductor part forms a part of a boundary between the light shielding area and the light transmission area.

2. The electro-optical device according to claim 1, wherein
    the second conductive layer is one of a scanning line or an island shaped wiring line, and
    the first conductive layer is the other of the scanning line and the island shaped wiring line.

3. The electro-optical device according to claim 1, comprising:
    a second conductor part disposed between the first conductive layer and the second conductive layer in the light shielding area, wherein
    the transistor is surrounded by the first conductive layer, the second conductive layer, the first conductor part, and the second conductor part, and
    an edge of the second conductor part forms another part of the boundary between the light shielding area and the light transmission area.

4. The electro-optical device according to claim 3, wherein
    a relay conductor part including the first conductor part and the second conductor part has a coupling portion that couples the first conductor part and the second conductor part, and is substantially H shaped in plan view.

5. The electro-optical device according to claim 4, wherein
    the relay conductor part is formed of tungsten.

6. The electro-optical device according to claim 5, wherein
    a barrier layer is provided at least one of between the relay conductor part and the first conductive layer, and between the relay conductor part and the second conductive layer.

7. The electro-optical device according to claim 1, wherein
    the light shielding area is disposed in a grid shape in plan view, and
    the transistor is disposed at a position corresponding to an intersection in the light shielding area in the grid shape.

8. The electro-optical device according to claim 1, wherein
    the light shielding area is disposed in a grid shape in plan view, and
    the transistor is disposed along the light shielding area between a first intersection and a second intersection in the light shielding area in the grid shape.

9. An electronic apparatus, comprising:
    a light source configured to emit light; and
    the electro-optical device according to claim 1 as an optical modulation device.

10. An electro-optical device, comprising:
    a first conductive layer;
    a second conductive layer;
    a first conductor part disposed between the first conductive layer and the second conductive layer and configured to electrically connect the first conductive layer and the second conductive layer; and
    a transistor disposed between the first conductive layer and the second conductive layer and surrounded by the first conductive layer, the second conductive layer, and the first conductor part, wherein
    a part of the first conductor part protrudes from an outer edge of the first conductive layer and protrudes from an outer edge of the second conductive layer in plan view and defines an opening region of a pixel.

11. An electro-optical device, comprising:
    a light shielding area including:
        a first conductive layer,
        a second conductive layer,
        a first conductor part disposed between the first conductive layer and the second conductive layer, and
        a transistor surrounded by the first conductive layer, the second conductive layer, and the first conductor part;

a second conductor part disposed between the first conductive layer and the second conductive layer in the light shielding area, and a light transmission area surrounded by the light shielding area, wherein an edge of the first conductor part forms a part of a boundary between the light shielding area and the light transmission area, the transistor is surrounded by the first conductive layer, the second conductive layer, the first conductor part, and the second conductor part, an edge of the second conductor part forms another part of the boundary between the light shielding area and the light transmission area, and a relay conductor part including the first conductor part and the second conductor part has a coupling portion that couples the first conductor part and the second conductor part, and is substantially H shaped in plan view.

* * * * *